(12) United States Patent
Liu

(10) Patent No.: US 9,681,687 B2
(45) Date of Patent: Jun. 20, 2017

(54) ELECTRONIC CIGARETTE AND BATTERY ROD THEREOF

(71) Applicant: KIMREE HI-TECH INC., Road Town, Tortola (GB)

(72) Inventor: Qiuming Liu, Guangdong (CN)

(73) Assignee: HUIZHOU KIMREE TECHNOLOGY CO., LTD. SHENZHEN BRANCH, Shenzhen, Guangdong (CN)

( * ) Notice: Subject to any disclaimer, the term of this patent is extended or adjusted under 35 U.S.C. 154(b) by 0 days.

(21) Appl. No.: 14/406,926

(22) PCT Filed: Dec. 5, 2013

(86) PCT No.: PCT/CN2013/088585
§ 371 (c)(1),
(2) Date: Dec. 10, 2014

(87) PCT Pub. No.: WO2015/070495
PCT Pub. Date: May 21, 2015

(65) Prior Publication Data
US 2016/0249679 A1  Sep. 1, 2016

(30) Foreign Application Priority Data

Nov. 18, 2013 (CN) .................... 2013 2 0729199 U

(51) Int. Cl.
*H01M 2/02* (2006.01)
*H01M 2/04* (2006.01)
(Continued)

(52) U.S. Cl.
CPC .......... *A24F 47/002* (2013.01); *A24F 47/008* (2013.01); *H01M 2/022* (2013.01);
(Continued)

(58) Field of Classification Search
CPC ....... A24F 47/002; H01M 2/02; H01M 2/026; H01M 2/105; H01M 2220/30; H01M 2/046
(Continued)

(56) References Cited

U.S. PATENT DOCUMENTS

2011/0011396 A1* 1/2011 Fang ............... A24F 47/008
128/202.21
2012/0279512 A1* 11/2012 Hon ............... A24F 47/008
131/329
(Continued)

FOREIGN PATENT DOCUMENTS

CN   201718468 U   1/2011
CN   203168031 U   9/2013
(Continued)

OTHER PUBLICATIONS

International Search Report corresponding to Application No. PCT/CN2013/088585; Date of Mailing: Dec. 5, 2013, English translation not available.

*Primary Examiner* — Joseph S Del Sole
*Assistant Examiner* — Mohamed K Ahmed Ali
(74) *Attorney, Agent, or Firm* — Yue Xu; U.S. Fairsky LLP

(57) ABSTRACT

A battery rod includes a battery cartridge, and a connector inserted at one end of the battery cartridge and for being connected with the atomizer. A battery supplying power for the atomizer is provided in the battery cartridge. The battery cartridge is a workpiece made of non-metallic material, a connection cartridge is inserted at one end of the battery cartridge and sleeved on the connector, the connection cartridge and the battery are coaxially arranged at different positions in an axial direction of the battery rod. A fastening ring for clamping the connector is sleeved on the outside of the connection cartridge where corresponds to a position of the connector, the battery cartridge and the fastening ring are coaxially arranged at different positions in the axial direction of the battery rod, and one end surface of the battery cartridge faces one end surface of the fastening ring.

9 Claims, 2 Drawing Sheets

(51) Int. Cl.
   *H01M 2/10*   (2006.01)
   *A24F 47/00*  (2006.01)
(52) U.S. Cl.
   CPC ......... *H01M 2/026* (2013.01); *H01M 2/0404*
           (2013.01); *H01M 2/046* (2013.01); *H01M*
           *2/105* (2013.01); *H01M 2/1055* (2013.01);
                   *H01M 2220/30* (2013.01)
(58) Field of Classification Search
   USPC ........................................................ 131/329
   See application file for complete search history.

(56) References Cited

U.S. PATENT DOCUMENTS

| | | | |
|---|---|---|---|
| 2013/0192623 A1* | 8/2013 | Tucker | H01C 17/00 |
| | | | 131/329 |
| 2013/0247924 A1* | 9/2013 | Scatterday | A61M 15/06 |
| | | | 131/329 |
| 2015/0000684 A1* | 1/2015 | Wu | A61M 15/06 |
| | | | 131/329 |

FOREIGN PATENT DOCUMENTS

| | | | |
|---|---|---|---|
| CN | 103349362 A | 10/2013 | |
| CN | 103355745 A | 10/2013 | |
| CN | 203219932 U | 10/2013 | |
| WO | 2013/147492 A1 | 10/2013 | |

* cited by examiner

ELECTRONIC CIGARETTE AND BATTERY ROD THEREOF

This application is the national phase of International Application No. PCT/CN2013/088585, titled "ELECTRONIC CIGARETTE AND BATTERY ROD THEREOF", filed on Dec. 5, 2013, which claims the benefit of priority to Chinese patent application No. 201320729199.2, titled "ELECTRONIC CIGARETTE AND BATTERY ROD THEREOF" and filed with the State Intellectual Property 10 Office of the People's Republic of China on Nov. 18, 2013, the entire disclosures of which are incorporated herein by reference.

FIELD

The present application relates to the technical field of electronic cigarette fittings, and in particular, to a battery rod. The present application also relates to an electronic cigarette having the battery rod.

BACKGROUND

The electronic cigarette is a common electronic product simulating the cigarette. The battery rod, as a main structure component, plays an important role in a whole working effect of the electronic cigarette. With improved production and increasing usage requirements, higher requirements are set by people for the performance of the battery rod.

In a conventional electronic cigarette, a battery cartridge is provided outside main components of the battery rod, to protect the main components of the battery rod from being affected by external environment. Normally, the battery cartridge for the battery rod is made of a hard material such as copper, iron or steel; although basic requirements in structure assembling and usage of the electronic cigarette may be satisfied, the soft touch of a real cigarette may not be simulated with the hard material, thereby greatly affecting user experience. Furthermore, a connector, which is inserted at one end of the battery cartridge and is connected to an atomizer, is apt to fall off during a detachment from the atomizer.

Hence, currently, how to improve the hand feeling and usage experience of the electronic cigarette and how to avoid the problem that the connector is apt to fall off are important technical problems to be solved by those skilled in the art.

SUMMARY

The application intends to provide a battery rod, with which a hand feeling and a usage experience of an electronic cigarette may be improved and a connector is avoided from falling off. The application further intends to provide an electronic cigarette having the above battery rod.

To solve the technical problem described above, a battery rod provided in the present application is for being assembled with an atomizer to form an electronic cigarette. The battery rod includes a battery cartridge and a connector which is inserted at one end of battery cartridge and is for being connected with the atomizer. A battery supplying power for the atomizer is provided in the battery cartridge. The battery cartridge is a workpiece made of a non-metallic material. A connection cartridge is inserted at one end of the battery cartridge and is sleeved on the connector. The connection cartridge and the battery are coaxially arranged and are located at different positions in an axial direction of the battery rod. A fastening ring for clamping the connector is sleeved on the outside of the connection cartridge at a position corresponding to a position of the connector. The battery cartridge and the fastening ring are coaxially arranged and are located at different positions in the axial direction of the battery rod. One end surface of the battery cartridge faces one end surface of the fastening ring.

Preferably, an outer circumferencial surface of the battery cartridge and an outer circumferencial surface of the fastening ring are flush with each other.

Preferably, a coating layer is sleeved on the outer circumferencial surface of the battery cartridge and the outer circumferencial surface of the fastening ring.

Preferably, the coating layer is a paster.

Preferably, the battery cartridge and the battery cartridge both are workpieces made of a non-metallic material having a hardness smaller than a hardness of copper.

Preferably, each of the battery cartridge and the battery cartridge is any one of a plastic workpiece, a rubber workpiece, and a paper workpiece.

Preferably, one end of the battery cartridge is provided with an end cap, the end of the battery cartridge being far away from the connector, the end cap is provided with an air hole, an airflow passage in communication with the air hole is formed between the battery and the battery cartridge, the airflow passage is for leading an airflow into the atomizer, the airflow is mixed with smoke in the atomizer and the mixture is inhaled into a mouth of a smoker.

Preferably, the connector includes a connection base, a holder provided in the connection base, a lower electrode assembly provided in the holder, and a spring leaf fixed at the outside of the connection base and abutting against an inner wall of the connection cartridge; the connection base is provided with an atomizer groove for an insertion of the atomizer; the spring leaf extends into the atomizer groove and elastically abuts against the atomizer; the lower electrode assembly and the connection base are respectively electrically connected to two electrodes of the battery and are respectively configured to be electrically connected to the atomizer.

Preferably, the two end surfaces of the battery cartridge and the fastening ring, facing each other, abut against each other.

An electronic cigarette is further provided in the application. The electronic cigarette includes a battery rod and an atomizer which are connected to each other; specifically, the battery rod is any one of the foregoing battery rods.

Compared with the background, by arranging the battery rod and the electronic cigarette provided in the application into the above structure, the stability of the structure is enhanced and the connector is avoided from falling off from the battery rod. Since the battery cartridge and the fastening ring are coaxially arranged and the end surfaces of the battery cartridge and the fastening ring face each other, the overall surface of the battery rod is flat, and the user is protected from being hurt by the fastening ring during usage. Besides, with the above structure, outer surfaces of electronic cigarettes placed together may be closely abutted against each other; hence, scratchings between the electronic cigarettes, falling of electronic parts and oil leaking of the atomizer, which are caused by vibration when the electronic cigarettes are transported or are put in a pocket of the user, are avoided. During an operation process, the battery cartridge made of the non-metallic material touches soft and comfortable, and a hand feeling of a cigarette may be well simulated, thereby greatly improving an overall simulation degree of the electronic cigarette and significantly improving the user experience.

BRIEF DESCRIPTION OF THE DRAWINGS

For more clearly illustrating technical solutions according to embodiments of the present application or conventional technologies, drawings to be used in descriptions of the embodiments or the conventional technologies are briefly introduced hereinafter. Apparently, the drawings are merely used to illustrate some embodiments of the present application, and those of ordinary skill in the art may achieve other drawings based on these drawings without any creative efforts.

DETAILED DESCRIPTION OF THE EMBODIMENTS

A battery rod is provided in the application, and a hand feeling and a usage experience of an electronic cigarette may be improved with the battery rob. In addition, an electronic cigarette having the battery rod is provided.

The application is further described in detail in conjunction with drawings and embodiments, for making a solution of the application better understood by those skilled in the art.

Figure 1:
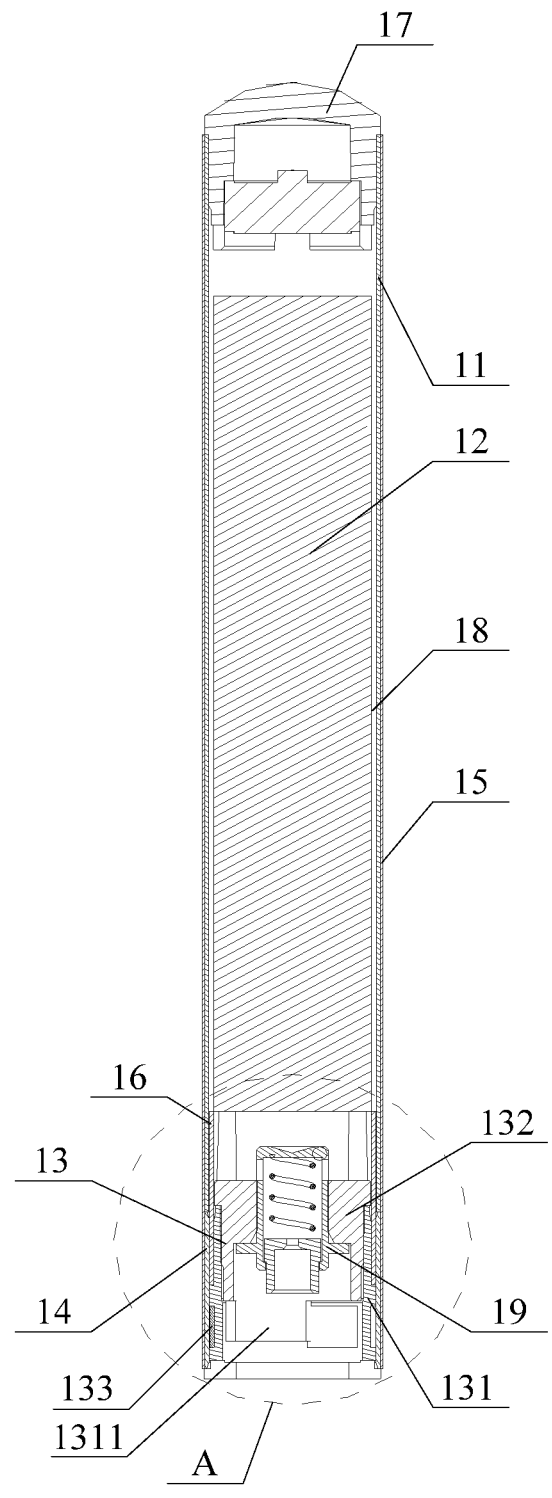
FIG. 1 is a section view of an assembling structure of a battery rod according to an embodiment of the application.
Figure 2:
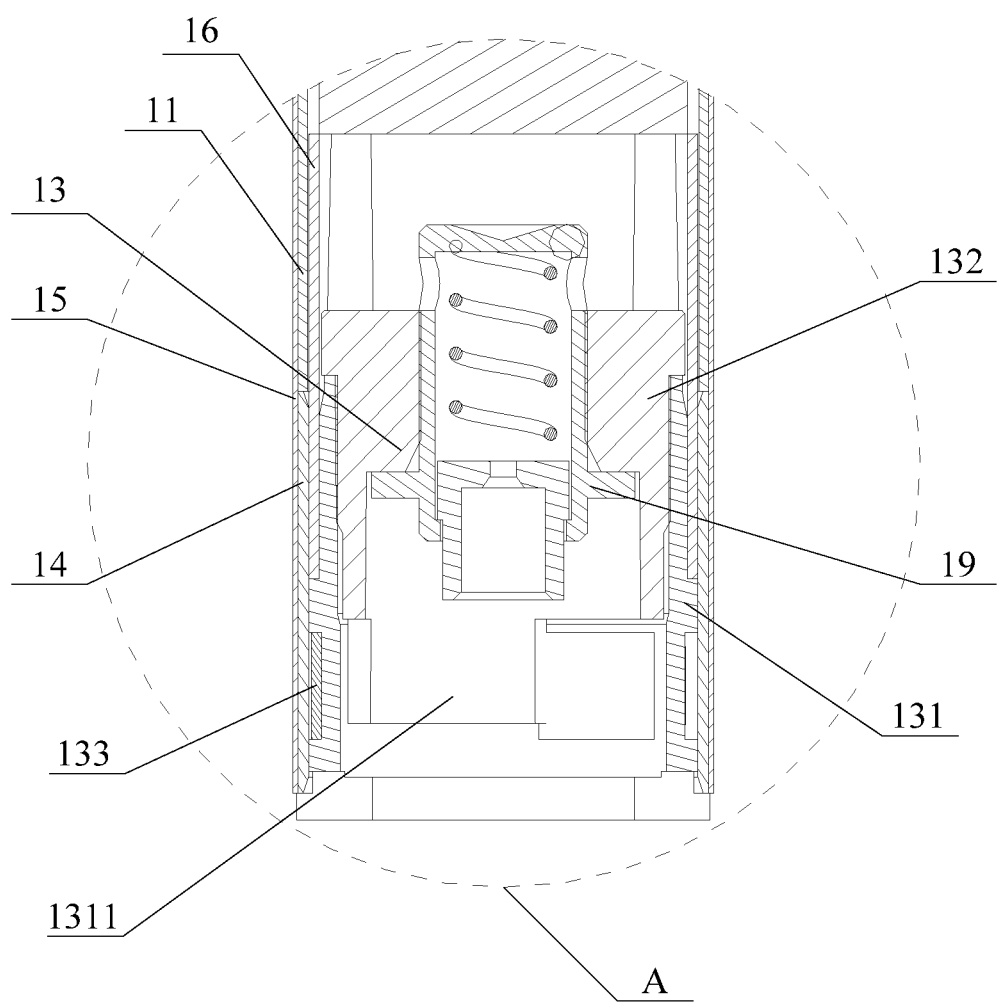
FIG. 2 is an enlarged schematic view of section A in FIG. 1.

Reference may be made to FIG. 1, which is a section view of an assembling structure of a battery rod according to an embodiment of the application.

In the embodiment, the battery rod provided in the present application is for being assembled with an atomizer to form an electronic cigarette. The battery rod includes a battery cartridge 11, and a connector 13 which is inserted at one end of battery cartridge 11 and connected with the atomizer. A battery 12 supplying power for the atomizer is provided in the battery cartridge 11. The battery cartridge 11 is a workpiece made of a non-metallic material. A connection cartridge 16 is inserted at one end of the battery cartridge 11 and is sleeved on the connector 13. The connection cartridge 16 and the battery 12 are coaxially arranged and are located at different positions in an axial direction of the battery rod. At a position corresponding to a position of the connector 13, a fastening ring 14 for clamping the connector 13 is sleeved on the outside of the connection cartridge 16. The battery cartridge 11 and the fastening ring 14 are coaxially arranged and are located at different positions in the axial direction of the battery rod. One end surface of the battery cartridge 11 faces one end surface of the fastening ring 14. During an operation process, the battery cartridge 11 made of the non-metallic material touches soft and comfortable, and a hand feeling of a cigarette may be well simulated, thereby greatly improving an overall simulation degree of the electronic cigarette and significantly improving the user experience.

Further, the two end surfaces of the battery cartridge 11 and the fastening ring 14 facing each other abut against each other, and an outer circumferencial surface of the battery cartridge 11 and an outer circumferencial surface of the fastening ring 14 are flush with each other. With the structure that the outer circumferencial surface of the battery cartridge 11 and the outer circumferencial surface of the fastening ring 14 are flush with each other, an outer structure of the electronic cigarette may be further optimized, an overall surface of the battery rod is flat and the battery rod is avoided from an uneven outer surface; accordingly, the user experience is further improved. In addition, a user is avoided from being hurt by the fastening ring during usage. Besides, outer surfaces of electronic cigarettes placed together may be closely abutted against each other; hence, scratchings between the electronic cigarettes, falling of electronic parts and oil leaking of the atomizer, which are caused by vibration when the electronic cigarettes are transported or are put in a pocket of a user, are avoided.

Further, a coating layer 15 is provided on the outer circumferencial surface of the battery cartridge 11 and the outer circumferencial surface of the fastening ring 14. The coating layer 15 may further ensure a flatness of an outer circumferencial surface of an assembling structure between the battery cartridge 11 and the connector 16, thereby further improving an overall outer structure of the electronic cigarette.

More specifically, the coating layer 15 is a paster. With a low procurement cost, a huge quantity of market supply, and an excellent bonding and fixation effect, the paster may meet assembling requirements of the electronic cigarette and the production cost of the electronic cigarette is effectively reduced. With the coated paster, the electronic cigarette having the battery rod further looks like the cigarette, thus improving the user experience. Furthermore, with the structure that the outer circumferencial surface of the battery cartridge 11 and the outer circumferencial surface of the fastening ring 14 are flush with each other, the service life of the battery rod coated by the paster may be lengthened since the paster is not easily scratched.

On another hand, the battery cartridge 11 is a workpiece made of a non-metallic material having a hardness smaller than that of copper. With the workpiece made of a soft material having a smaller harness, the whole hand feeling of the electronic cigarette may be further improved, and the user experience is better.

Furthermore, the battery cartridge 11 may be any one of a plastic workpiece, a rubber workpiece and a paper workpiece. Of course, the battery cartridge 11 is not restricted to the plastic workpiece, the rubber workpiece and the paper workpiece as long as practical usage requirements of the electronic cigarette may be satisfied.

Furthermore, one end of the battery cartridge 11 is provided with an end cap 17, the end being far away from the connector 13. The end cap 17 is provided with an air hole (not shown in the figure). An airflow passage 18 in communication with the air hole is formed between the battery 12 and the battery cartridge 11. The airflow passage 18 is for leading an airflow into the atomizer, the airflow is mixed with smoke in the atomizer and the mixture is inhaled into a mouth of a smoker.

Since the airflow passage 18 occupying a certain space is formed between the battery 12 and the battery cartridge 11, and the connection cartridge 16 and the battery 12 are coaxially arranged and are located at different positions in the axial direction of the battery rod, a thickness of a wall of the battery rod is small where the battery 12 is located. With the airflow passage 18, the battery cartridge 11 is elastically deformable; hence, the airflow is ensured with free passage and the hand feeling is better.

Further, the connector 13 includes a connection base 131, a holder 132 provided in the connection base 131, a lower electrode assembly 19 provided in the holder, and a spring leaf 133 fixed at the outside of the connection base 131 and abutting against an inner wall of the connection cartridge 16. The connection base 131 is provided with an atomizer groove 1311 for an insertion of the atomizer. The spring leaf 133 extends into the atomizer groove and elastically abuts against the atomizer. The lower electrode assembly 19 and the connection base 131 are respectively electrically connected to two electrodes of the battery 12 and are respectively for being electrically connected to the atomizer. Because the spring leaf 133 extends into the atomizer groove and elastically abuts against the atomizer, the reliability of a connection of the atomizer and the battery rod may be improved.

Further, the fastening ring 14 is a part made of a metallic material such as copper, iron, steel or the like, and the structure strength and tenacity of the metallic material are better than those of a non-metallic material; hence, it is ensured that the fastening ring 14 may not be torn easily during assembling. Therefore, with a cooperation of the fastening ring 14 made of the metallic material and the battery cartridge 11 made of the non-metallic material, advantages such as a steady and reliable battery rod structure, a high product yield, a small overall weight and a high similarity to the cigarette may be realized.

In an embodiment, an electronic cigarette provided in the application includes a battery rod and an atomizer which are connected to each other, and specifically, the battery rod is the battery rod described in the foregoing embodiment. The hand feeling and the user experience of the electronic cigarette and are good.

In conclusion, by arranging the battery rod and the electronic cigarette provided in the application into the above structure, the stability of the structure is enhanced and the connector is avoided from falling off from the battery rod. Since the battery cartridge and the fastening ring are coaxially arranged and the end surfaces of the battery cartridge and the fastening ring face each other, the overall surface of the battery rod is flat, and the user is protected from being hurt by the fastening ring during usage. Besides, with the above structure, outer surfaces of electronic cigarettes placed together may be closely abutted against each other; hence, scratchings between the electronic cigarettes, falling of electronic parts and oil leaking of the atomizer, which are caused by vibration when the electronic cigarettes are transported or are put in a pocket of the user, are avoided. During an operation process, the battery cartridge made of the non-metallic material touches soft and comfortable, and a hand feeling of a cigarette may be well simulated, thereby greatly improving an overall simulation degree of the electronic cigarette and significantly improving the user experience.

The battery rod and the electronic cigarette having the battery rod provided in the application are detailed hereinabove. The principle and the embodiments of the present application are illustrated herein by specific examples. The above descriptions of embodiments are only intended to help the understanding of the method and the spirit of the present application. It should be noted that, many modifications and improvements may be made to the present application by those skilled in the art without departing from the principle of the present application, and these improvements and modifications are also deemed to fall into the protection scope of the present application defined by the claims.

The invention claimed is:

1. A battery rod, which is configured to assemble with an atomizer to form an electronic cigarette, comprising: a battery cartridge, and a connector which is inserted at one end of the battery cartridge and is configured to connect with the atomizer, a battery configured to supply power for the atomizer being provided in the battery cartridge, wherein the battery cartridge is a workpiece made of a non-metallic material, a connection cartridge is inserted at one end of the battery cartridge and is sleeved on the connector, the connection cartridge and the battery are coaxially arranged and are located at different positions in an axial direction of the battery rod, and the connection cartridge is inserted to a location in the battery cartridge deeper than a location in the battery cartridge to which the connector is inserted; wherein a fastening ring configured to clamp the connector is sleeved on the outside of the connection cartridge at a position corresponding to a position of the connector, the battery cartridge and the fastening ring are coaxially arranged and are located at different positions in the axial direction of the battery rod, and one end surface of the battery cartridge faces one end surface of the fastening ring.

2. The battery rod according to claim 1, wherein an outer circumferential surface of the battery cartridge and an outer circumferential surface of the fastening ring are flush with each other.

3. The battery rod according to claim 1, wherein a coating layer is sleeved on an outer circumferential surface of the battery cartridge and an outer circumferential surface of the fastening ring.

4. The battery rod according to claim 3, wherein the coating layer is an adhesive layer.

5. The battery rod according to claim 1, wherein the battery cartridge is a workpiece made of a non-metallic material having a hardness smaller than a hardness of copper.

6. The battery rod according to claim 1, wherein the battery cartridge is any one of a plastic workpiece, a rubber workpiece and a paper workpiece.

7. The battery rod according to claim 1, wherein the connector comprises a connection base, a holder provided in the connection base, a lower electrode assembly provided in the holder, and a spring leaf fixed at the outside of the connection base and abutting against an inner wall of the connection cartridge; the connection base is provided with an atomizer groove configured for an insertion of the atomizer; the spring leaf extends into the atomizer groove and elastically abuts against the atomizer; the lower electrode assembly and the connection base are respectively electrically connected to two electrodes of the battery and are respectively configured to be electrically connected to the atomizer.

8. The battery rod according to claim 1, wherein the two end surfaces of the battery cartridge and the fastening ring, facing each other, abut against each other.

9. An electronic cigarette, comprising a battery rod and an atomizer which are connected to each other, wherein the battery rod comprises: a battery cartridge, and a connector which is inserted at one end of the battery cartridge and is configured to connect with the atomizer, and a battery configured to supply power for the atomizer is provided in the battery cartridge; wherein the battery cartridge is a workpiece made of a non-metallic material, a connection cartridge is inserted at one end of the battery cartridge and is sleeved on the connector, the connection cartridge and the battery are coaxially arranged and are located at different positions in an axial direction of the battery rod, and the connection cartridge is inserted to a location in the battery cartridge deeper than a location in the battery cartridge to which the connector is inserted; wherein a fastening ring configured to clamp the connector is sleeved on the outside of the connection cartridge at a position corresponding to a position of the connector, the battery cartridge and the fastening ring are coaxially arranged and are located at different positions in the axial direction of the battery rod, and one end surface of the battery cartridge faces one end surface of the fastening ring.

* * * * *